United States Patent [19]
Becker

[11] Patent Number: 5,442,820
[45] Date of Patent: Aug. 22, 1995

[54] TOILET TANK FLUSHING MECHANISM

[76] Inventor: Henry A. Becker, 3 Hawk Hill Way, Caledon Ontario, Canada, L0N 1C0

[21] Appl. No.: 242,353

[22] Filed: May 13, 1994

[30] Foreign Application Priority Data

May 13, 1993 [CA] Canada .................................. 2096178

[51] Int. Cl.6 ............................................. E03D 1/00
[52] U.S. Cl. ........................................... 4/415; 137/420
[58] Field of Search ............................. 4/415, 381–383; 137/417, 420, 421

[56] References Cited

U.S. PATENT DOCUMENTS

| | | | |
|---|---|---|---|
| 2,841,169 | 7/1958 | Martinet et al. | 137/421 X |
| 3,040,769 | 6/1962 | Lamb | 137/420 |
| 3,401,717 | 9/1968 | Lamb | 137/421 |
| 4,351,071 | 9/1982 | Clar | 4/381 X |
| 4,615,056 | 10/1986 | Grant | 4/366 |
| 4,840,196 | 6/1989 | Antunez | 137/410 |
| 5,179,739 | 1/1993 | Mann | 4/382 X |

*Primary Examiner*—Charles E. Phillips

[57] ABSTRACT

A toilet tank flushing mechanism is disclosed. The toilet tank flushing mechanism comprises a ballcock mounted within the toilet tank for selectively permitting water from an external source to enter the tank. The ballcock includes a mounting plate securely connected thereto, which mounting plate has a primary float arm pivotally mounted thereto for movement between a raised shut-off position and a lowered flushing position, a holding member pivotally mounted thereto for movement between a holding position whereat the primary float arm is held in its raised shut-off position and a tilted release position whereat the primary float arm is released so as to be permitted to move to its lowered flushing position, a trigger member slidably mounted thereon for movement between a set position whereat the holding member is retained in its holding position and a freeing position whereat the holding member is suddenly freed so as to permit it to move to its tilted release position, and a substantially rigid water level tracking float arm pivotally mounted thereon for movement between a raised neutral position whereat the trigger member is held in the set position and a lowered trip position whereat the trigger member is caused to move to its releasing position.

13 Claims, 4 Drawing Sheets

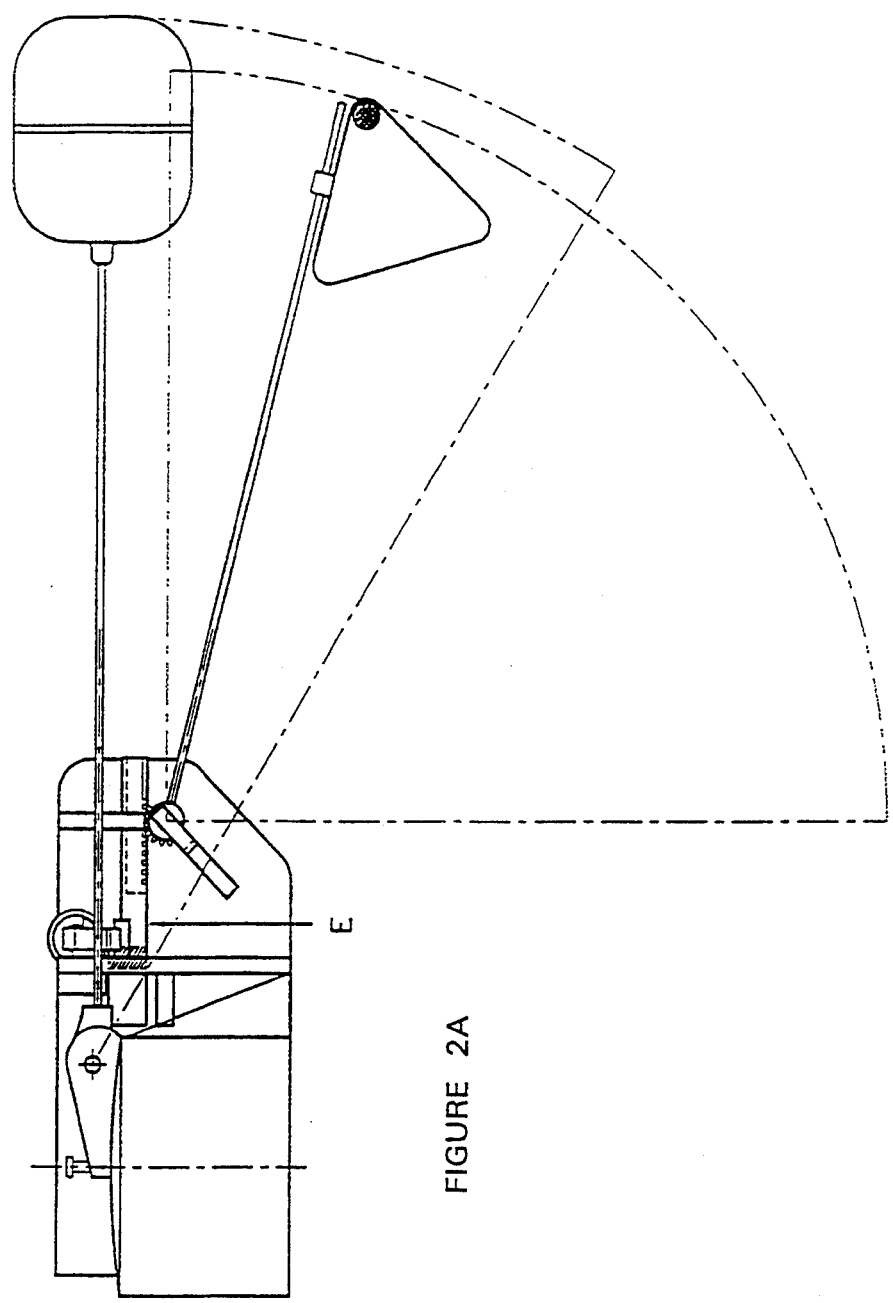

TOILET TANK FLUSHING MECHANISM

FIELD OF THE INVENTION

This invention relates to toilet tank flushing mechanisms and more particularly to ballcocks used in conjunction with such mechanisms. Specifically, a toilet tank flushing mechanism employs a ballcock having a float arm arrangement that permits the conservation of water, is disclosed.

BACKGROUND OF THE INVENTION

Conventional toilet tanks have a lever mounted on the outside of the tank which is pushed down in order to flush the toilet. A chain is thereby caused to open a flapper valve at the bottom of the tank. Opening this valve allows the water in the tank to exit the tank and flow into the toilet bowl, thus flushing the toilet bowl. As the water level in the tank drops, a large float pivotally mounted on a ballcock at the top of the tank descends with the water level, thus causing the ballcock to open. Typically, the ballcock opens when the tank is still two-thirds full and is still emptying. The opening of the ball cock permits the inflow of more water, which begins to flow into the tank at the same time that water is flowing out the bottom of the tank through the flapper valve, which is quite wasteful.

Various attempts have been made to reduce the amount of water used in each flush, for economic and water conservation reasons. One simple way is to adjust the vertical position of the large float to a lower level so that is causes the ballcock to shut off at a lower water level. Accordingly, less water is held in the tank for use when flushing. This adjustment is often done simply by bending the metal arm that the large float is mounted on. While this method does reduce the amount of water being used, it does not stop water from flowing into the tank through the ballcock while water is simultaneously flowing out of the tank through the flapper valve.

Other methods such as putting bricks in the toilet tank have also been used to reduce the amount of water used during flushing of the toilet. Again, this method does not stop water from flowing into the tank through the ballcock while water is simultaneously flowing out of the tank through the flapper valve.

SUMMARY OF THE INVENTION

According to the preferred aspect of the present invention, there is disclosed a toilet tank flushing mechanism comprising a ballcock operatively mounted within the toilet tank for receiving water from an external source, and selectively permitting water from the external source to enter into the toilet tank. The ballcock further comprises a mounting plate securely connected thereto, with a primary float arm operatively mounted on the mounting plate for movement between a raised shut-off position and a lowered refilling position, whereby the ballcock is caused either to be closed or open, respectively, a holding member operatively mounted on the mounting plate for movement between a holding position whereat the primary float arm is held in its raised shut-off position and a tilted release position whereat the primary float arm is released so as to be permitted to move to its lowered refilling position, a trigger member operatively mounted on the mounting plate for movement between a set position whereat the holding member is retained in its holding position and a freeing position whereat the holding member is suddenly freed so as to permit it to move to its tilted release position, and a water level tracking float arm operatively mounted on the main support member for movement between a raised neutral position whereat the trigger member is held in the set position and a lowered trip position whereat the trigger member is caused to move to its releasing position.

BRIEF DESCRIPTION OF THE DRAWINGS

Embodiments of this invention will now be described by way of example in association with the accompanying drawings in which:

FIG. 2A (extended) is a view similar to that shown in FIG. 2, but showing only a portion of the toilet tank flushing mechanism;

DISCUSSION OF THE PRIOR ART

Figure 1:
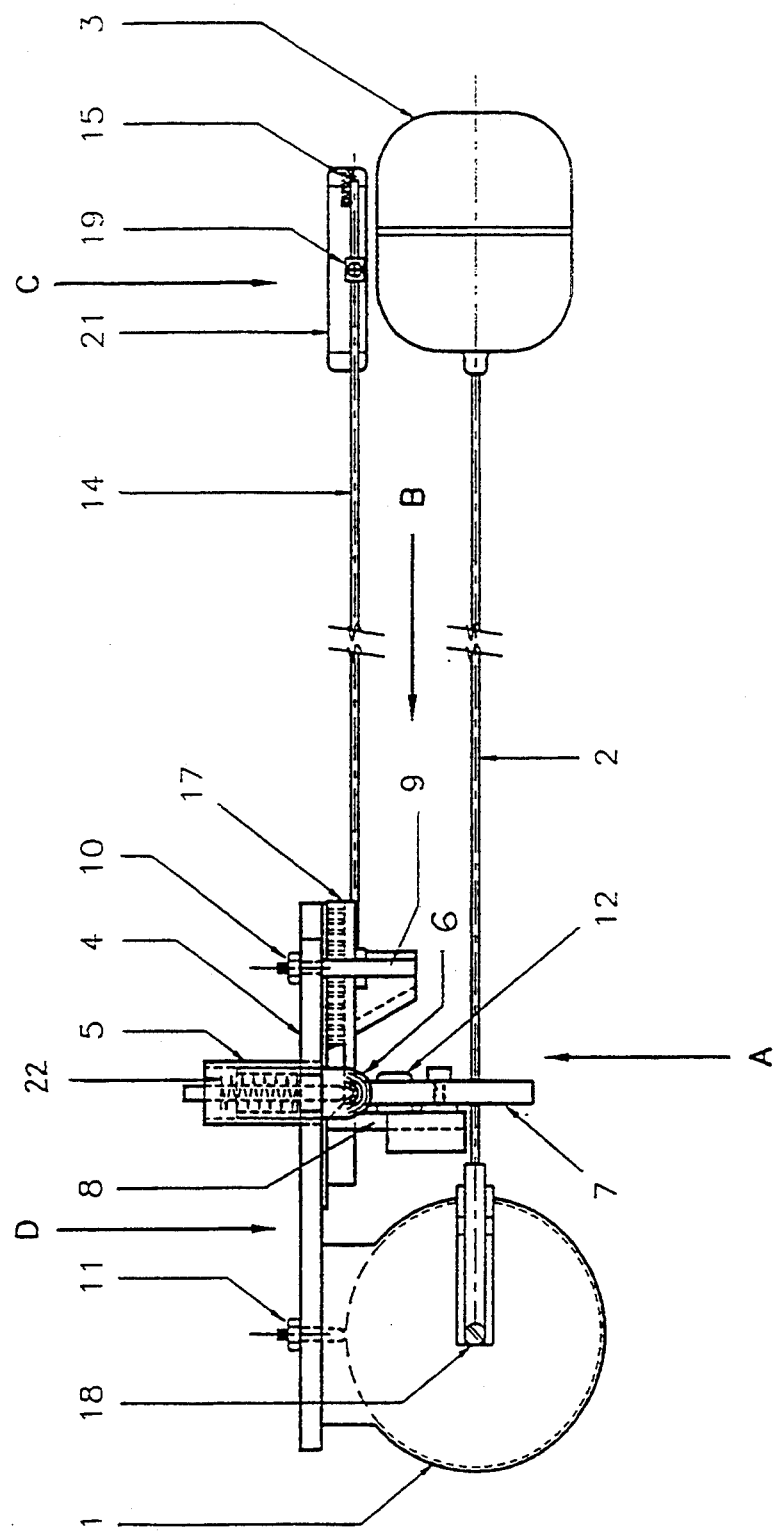
FIG. 1 is a top plan view of the toilet tank flushing mechanism of the present invention.

U.S. Pat. No. 4,351,071 to CLAR discloses a water saving device wherein a secondary float 54 moves up and down with the water level in the tank when the toilet tank is flushed. The secondary float 54 has tied to it a length of cord 46, at one end thereof. The other end of the length of cord 46 is tied to a post 48 on a link 34. When the secondary float 54 moves downwardly, the length of cord 46 pulls the one end of the link 34 downwardly. The link 34 pivots at pin 36 and contacts an end portion of the latch member 26, which latch member 26 pivots at pivot pin 27. The link 34 and the latch member 26 are biased together by elastic band 36'. The latch member 26 has a support shoulder 32, which support shoulder 32 supports the rod 20 that has the main float 18 mounted thereon in its raised position. When the toilet is flushed, the secondary float 54 lowers with the water level, and causes the length of cord 46 to pull the end of the link 34 downwardly, which in turn pushes up on the end of the latch member 26. Accordingly, the lower portion of the latch member 26 that has the support shoulder 32 thereon moves laterally away from the arm 20, thus causing the arm 20 to drop. Accordingly, the inlet valve assembly 14 is opened so as to allow water to flow into the tank. This device has several disadvantages including that the float arm is moved laterally with the movement of the latch member 26, since the latch member 26 moves quite slowly. Over time, the arm 20 could become more loosely connected to the inlet valve assembly 14 and could be moved laterally all the way to the end of the travel of the latch member 26, and thus not release from the support shoulder of the latch member 26. What is needed is a device that holds a float arm at a raised position wherein the float arm is not pulled laterally during release and is released suddenly so as to ensure that it is released.

DETAILED DESCRIPTION OF THE PREFERRED EMBODIMENTS

Figure 3:
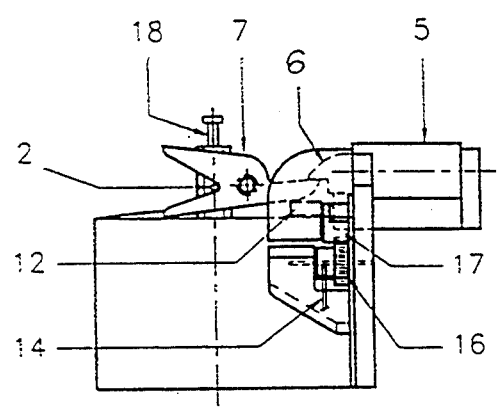
FIG. 3 is an end elevational view of the toilet tank flushing mechanism of claim 1, with the floats omitted for the sake of clarity.
Figure 7:
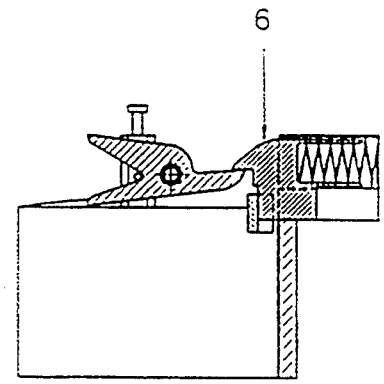
FIG. 7 is a sectional end view taken along section lines 7—7 in FIG. 2.
Figure 2:
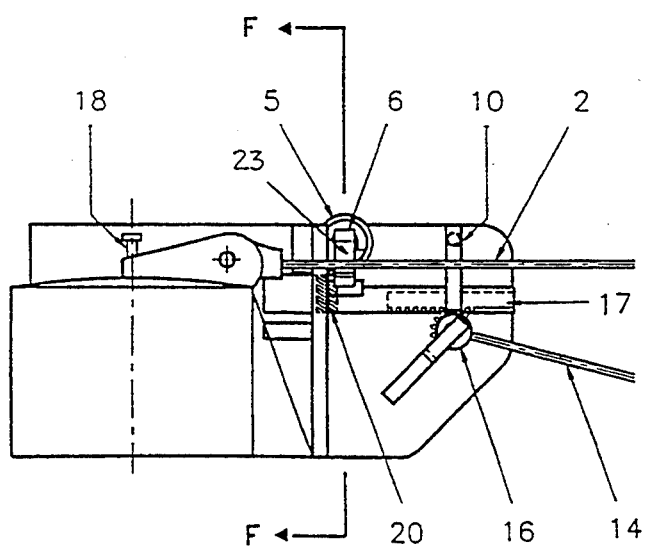
FIG. 2 is a side elevational view of the toilet tank flushing mechanism of claim 1.
Figure 4:
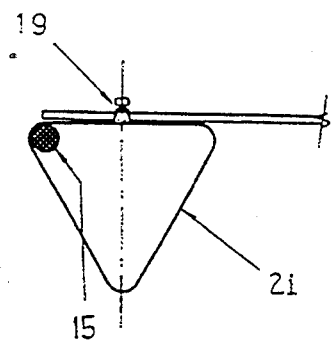
FIG. 4 is a close-up view of a portion of the water level tracking float arm.
Figure 6:
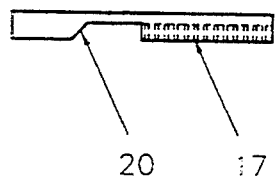
FIG. 6 is a bottom plan view of the gear rack.
Figure 5:
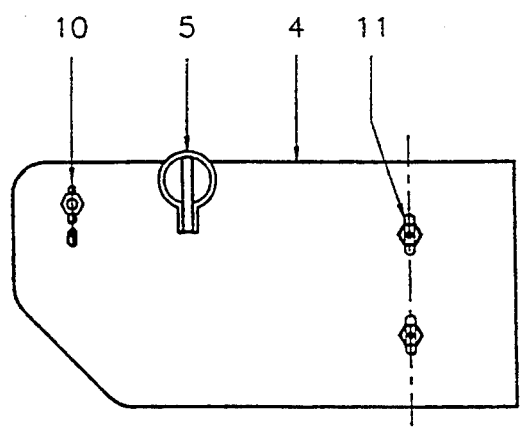
FIG. 5 is a side elevational view of the main support member of the toilet tank flushing mechanism of claim 1, taken from the opposite side as is FIG. 2 (extended)

Reference will now be made to FIGS. 1 through 7 to describe the present invention in detail.

The toilet tank flushing mechanism comprises a ballcock 1 that is operatively mounted within the toilet tank (not shown) by way of a water inflow pipe (not shown). A mounting plate 4, which includes a first support 8 and a second support 9 attached to the mounting plate 4 by way of any suitable conventional mounting means such as gluing or threaded fasteners, is securely connected to the ballcock 1 by way of a pair of screws and co-operating nuts 11. Preferably, the second support 9 is divided into two sections, with the top section being removably attached to the mounting plate 4 by way of a screw and co-operating nut 10, for reasons as will be discussed subsequently.

A rod forming a primary float arm 2 having conventional float 3 secured thereto at the outer end thereof. The float arm 2 is pivotally mounted at the top of the ballcock 1 for movement between a raised shut-off position and a lowered refilling position, so as to operate an internal mechanism (not shown) within the ballcock 1 thereby causing the ballcock to be closed and opened, respectively. The height at which the float 3 actuates the internal mechanism within the ballcock 1 can be adjusted by way of adjustment screw 18 at the top of the ballcock 1.

The primary float arm 2 is retained in a forked holding member 7 in its raised shut-off position. In the raised shut-off position, the internal mechanism of the ballcock 1 precludes water from flowing into the toilet tank. In the lowered refilling position, the internal mechanism of the ballcock 1 permits water to flow into the toilet tank.

The forked holding member 7 is pivotally mounted on the first support 8, for movement between a holding position and a tilted release position. In the holding position, the primary float arm 2 is held by the forked holding member 7 in its raised shut-off position; and in the tilted release position, the primary float arm 2 is released from its raised shut-off position so as to be permitted to move to its lowered refilling position. A stop member 12 is securely mounted to the first support 8 and precludes the forked holding mechanism 7 from travelling past its holding position.

The forked holding member 7 is retained in its holding position by a trigger member 6, which trigger member 6 is horizontally slidably mounted on the mounting plate 4 for movement between a set position and a freeing position. The trigger member 6 is retained within a trigger housing 5 and is spring biased by a spring member 22 to its set position. The spring member 22 is preferably made of stainless steel and should be calibrated to provide a biasing force just strong enough to move the trigger 6. In the set position, the trigger member 6 retains the forked holding member 7 in its holding position; and in its freeing position, the forked holding member is suddenly freed by the trigger member so as to permit the holding member to move to its tilted release position.

A substantially rigid water level tracking float arm 14, including a float 21 secured at the end thereof in adjustable relation thereto by way of adjustment screw 19, is pivotally mounted at the second support 9, which extends outwardly from the mounting plate 4 for movement between a raised neutral position and a lowered trip position. When the water level tracking float arm 14 is in its raised neutral position, the trigger member 6 is permitted to travel to its set position. When the water level tracking float arm 14 is in its lowered trip position, the trigger member 6 is caused to move to its releasing position. The water level tracking float arm 14 has secured to it at its pivot a pinion gear 16, which pinion gear 16 pivots in conjunction with the pivoting of the water level tracking float arm 14. The pinion gear 16 is operatively engaged with a gear rack 17, which gear rack 17 is slidably mounted on the mounting plate 4 between the first support 8 and the second support 9, for movement between a first position and a second position. In its first position, the gear rack 17 is disposed towards the ballcock 1 and does not engage the trigger member 6. In its second position, the gear rack 17 is disposed away from the ballcock 1 and a sloped cam surface 20 engages an opposed co-operating cam follower 23 on the end of the trigger member 6. As the gear rack 17 moves from its first position to its second position the sloped cam surface 20 thereon slidably engages the co-operating cam follower 23 on the end of the trigger member 6. The engagement of the pinion gear 16 within the gear rack 17 may be adjusted, if necessary. The top section of the second support 9 must be removed for such adjustment to be performed.

In use, when the toilet is flushed, a flapper valve 99 located at the bottom of the toilet tank is lifted by way of a chain (not shown) that connects the flapper valve to the flush handle (not shown). When the flapper valve 99 opens, water from the toilet tank is thereby permitted to flush the toilet bowl. As the water level in the toilet tank lowers, the float 21 lowers with the water level. Accordingly, the water level tracking float arm 14 pivots downwardly until the float 21 reaches the bottom area of the toilet tank. The water level tracking float arm 14 may be configured such that the float 21 closes the flapper valve 99 so as to provide a positive and direct closing action of the flapper valve, instead of relying on a lowered water level. As the water level tracking float arm 14 pivots downwardly, the pinion gear 16 correspondingly pivots therewith. The pivoting movement of the pinion gear 16 causes corresponding horizontal movement of the engaged gear rack 17 from its first position to a second position. As the gear rack 17 travels from its first position to its second position, the cam surface 20 on the gear rack 17 slidably engages the co-operating cam surface on the end of the trigger member 6, thus causing the trigger member 6 to be slidably moved from its set position to its freeing position, against the bias of the biasing spring in the trigger housing 5. The float 21 on the water level tracking float arm 14 has a small internal weight 15 to aid in overcoming the biasing force of the spring member 22 of the trigger member 6. As the trigger member 6 reaches its freeing position, the forked holding member 7 is suddenly freed so as to permit the forked holding member 7 to move to its tilted released position, whereat the primary float arm 2 is released so that it can move to its lowered refilling position, thus permitting the toilet tank to be refilled with fresh water.

As the water level in the tank rises, the primary float arm 2 and the water level tracking float arm 14 are each pushed upwardly by the rising water. As the primary float arm 2 reaches its raised shut-off position, the forked holding member 7 is correspondingly caused to pivot to its holding position. Simultaneously, as the water level tracking float arm 14 is raised, the pinion gear 16 causes the gear rack 17 to return to its first position, thus permitting the biasing spring member 22 to return the trigger member 6 to its set position, whereat the forked holding member 7 is retained in its holding position.

In an alternative embodiment, it is envisioned that the water level tracking float arm would have a cam member secured thereto with the cam member having a cam surface thereon. The cam surface would directly operatively engage the cam follower on the trigger member, so as to cause or permit movement, as the case may be, of the trigger member.

Other modifications and alterations may be used in the design and manufacture of the apparatus of the present invention without departing from the spirit and scope of the accompanying claims.

What is claimed is:

1. A toilet tank flushing mechanism comprising:
   a ballcock operatively mounted within said toilet tank for receiving water from an external source, and selectively permitting water from said external source to enter into said toilet tank;
   a primary float arm operatively mounted on said ballcock for movement between a raised shut-off position and a lowered refilling position whereby said ballcock is caused either to be closed or open, respectively;
   a holding member operatively mounted on said ballcock for movement between a holding position whereat said primary float arm is held in its raised shut-off position and a tilted release position whereat said primary float arm is released so as to be permitted to move to its lowered refilling position;
   a trigger member operatively mounted on said ballcock for movement between a set position whereat said holding member is retained in its holding position and a freeing position whereat said holding member is suddenly freed so as to permit said holding member to move to its tilted release position, said trigger member having a cam follower;
   a water level tracking float arm operatively mounted on said ballcock for pivotal movement between a raised neutral position whereat said trigger member is permitted to travel to its said set position and a lowered trip position whereat said trigger member is caused to move to its releasing position; and
   a cam surface mounted on said ballcock assembly and being associated with said water level tracking float arm so as to slideably engage with said cam follower upon pivotal movement of said water level tracking float arm so as to cause said trigger member to move to said freeing position when said water level tracking float arm is in its lowered trip position.

2. The toilet tank flushing mechanism of claim 1, wherein said water level tracking float arm is substantially rigid.

3. The toilet tank flushing mechanism of claim 1, wherein said ballcock further comprises a mounting plate securely connected thereto.

4. The toilet tank flushing mechanism of claim 1, wherein said holding member, said trigger member, and said water level tracking float arm are operatively mounted on said mounting plate.

5. The toilet tank flushing mechanism of claim 4, wherein said water level tracking float arm is pivotally mounted on said mounting plate.

6. The toilet tank flushing mechanism of claim 1, wherein said trigger member is spring biased so as to be normally in said retaining position.

7. The toilet tank flushing mechanism of claim 6, wherein said trigger member is slidably mounted.

8. The toilet tank flushing mechanism of claim 1, wherein said holding member is forked and said primary float arm is held in the jaws of said forked holding member.

9. The toilet tank flushing mechanism of claim 8, wherein said forked holding member is pivotally mounted on said mounting plate.

10. The toilet tank flushing mechanism of claim 1, wherein said water level tracking float arm contacts a flapper valve located at the bottom of said toilet tank when said water level tracking float arm is in its lowered trip position, to thereby close said flapper valve.

11. A toilet tank flushing mechanism comprising:
    a ballcock operatively mounted within said toilet tank for receiving water from an external source, and selectively permitting water from said external source to enter into said toilet tank, said ballcock further comprising a mounting plate securely connected thereto;
    a primary float arm operatively mounted on said ballcock for movement between a raised shut-off position and a lowered refilling position whereby said ballcock is caused either to be closed or open, respectively;
    a holding member operatively mounted on said ballcock for movement between a holding position whereat said primary float arm is held in its raised shut-off position and a tilted release position whereat said primary float arm is released so as to be permitted to move to its lowered refilling position;
    a trigger member operatively mounted on said ballcock for movement between a set position whereat said holding member is retained in its holding position and a freeing position whereat said holding member is suddenly freed so as to permit said holding member to move to its tilted release position;
    a water level tracking float arm operatively mounted on said ballcock for movement between a raised neutral position whereat said trigger member is permitted to travel to its said set position and a lowered trip position whereat said trigger member is caused to move to its releasing position, said water level tracking float arm being substantially rigid;
    said holding member, said trigger member, and said water level tracking float arm being operatively mounted on said mounting plate,
    said water level tracking float arm being pivotally mounted on said mounting plate,
    wherein said water level tracking float arm has pinion gear mounted thereon for corresponding pivotal movement therewith, and said pinion gear engages a gear rack that intimately engages said trigger member so as to cause said trigger member to move to its releasing position.

12. The toilet tank flushing mechanism of claim 4, wherein said gear rack has a cam surface thereon and said trigger member has a cam follower thereon, said cam surface and said cam follower slidably engaging each other.

13. A toilet tank flushing mechanism comprising:

a ballcock operatively mounted within said toilet tank for receiving water from an external source, and selectively permitting water from said external source to enter into said toilet tank;

a primary float arm operatively mounted on said ballcock for movement between a raised shut-off position and a lowered refilling position whereby said ballcock is caused either to be closed or open, respectively;

a holding member operatively mounted on said ballcock for movement between a holding position whereat said primary float arm is held in its raised shut-off position and a tilted release position whereat said primary float arm is released so as to be permitted to move to its lowered refilling position;

a trigger member operatively mounted on said ballcock for movement between a set position whereat said holding member is retained in its holding position and a freeing position whereat said holding member is suddenly freed so as to permit said holding member to move to its tilted release position;

a water level tracking float arm operatively mounted on said ballcock for movement between a raised neutral position whereat said trigger member is permitted to travel to its said set position and a lowered trip position whereat said trigger member is caused to move to its releasing position;

wherein said trigger member is spring biased so as to be normally in said retain position, and wherein said trigger member is horizontally slideably mounted.

* * * * *